(12) United States Patent
Dodd

(10) Patent No.: US 7,845,217 B2
(45) Date of Patent: Dec. 7, 2010

(54) TRACTOR/TRAILER SUSPENSION WITH HUB TEMPERATURE INDICATING DEVICE

(75) Inventor: Cully B. Dodd, McKinney, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 0 days.

(21) Appl. No.: 12/325,895

(22) Filed: Dec. 1, 2008

(65) Prior Publication Data
US 2010/0132444 A1 Jun. 3, 2010

(51) Int. Cl.
*B60B 27/00* (2006.01)
(52) U.S. Cl. .................. 73/117.03; 301/105.1
(58) Field of Classification Search .............. 73/115.07, 73/117.03; 301/105.1
See application file for complete search history.

(56) References Cited

U.S. PATENT DOCUMENTS

| | | | | |
|---|---|---|---|---|
| 2,694,997 A * | 11/1954 | Alger, Jr. | ..... | 116/106 |
| 2,952,238 A * | 9/1960 | Barber | ..... | 116/101 |
| 3,569,695 A | 3/1971 | McLean | | |
| 4,016,762 A * | 4/1977 | Payne | ..... | 116/217 |
| 4,119,284 A * | 10/1978 | Belmont | ..... | 246/169 A |
| 4,812,826 A * | 3/1989 | Kaufman et al. | ..... | 340/682 |
| 4,818,119 A | 4/1989 | Busch et al. | | |
| 4,947,786 A | 8/1990 | Maynard et al. | | |
| 5,482,358 A | 1/1996 | Kuck | | |
| 6,203,114 B1 | 3/2001 | Ehrlich | | |
| 6,546,892 B2 | 4/2003 | Kelly, Jr. et al. | | |
| 6,759,963 B2 * | 7/2004 | Hayes | ..... | 340/584 |
| 6,861,836 B2 * | 3/2005 | Sammataro et al. | ..... | 324/200 |
| 7,185,955 B2 * | 3/2007 | Dombroski | ..... | 301/108.1 |
| 7,547,077 B2 * | 6/2009 | Melberg et al. | ..... | 301/108.1 |
| 2008/0290722 A1 * | 11/2008 | Koschinat | ..... | 301/108.1 |

* cited by examiner

*Primary Examiner*—Freddie Kirkland, III
(74) *Attorney, Agent, or Firm*—Smith IP Services

(57) ABSTRACT

A vehicle suspension includes a hub and a hub temperature indicating device visible from an exterior of the hub and exposed to a temperature within an interior of the hub, and including a material which changes color in response to a predetermined change in the hub interior temperature. A hub temperature indicating device includes one of a hub cap plug and a hub cap window, including a material which changes color in response to a predetermined change in temperature in the hub interior. Another hub temperature indicating device includes a material which is operative to change color in response to a temperature change in a hub interior, the material comprising an irreversible temperature change indicating material; another material adjacent the first material, and which is operative to transfer heat between the hub interior and the first material; and the device being configured to attach to a hub cap.

15 Claims, 5 Drawing Sheets

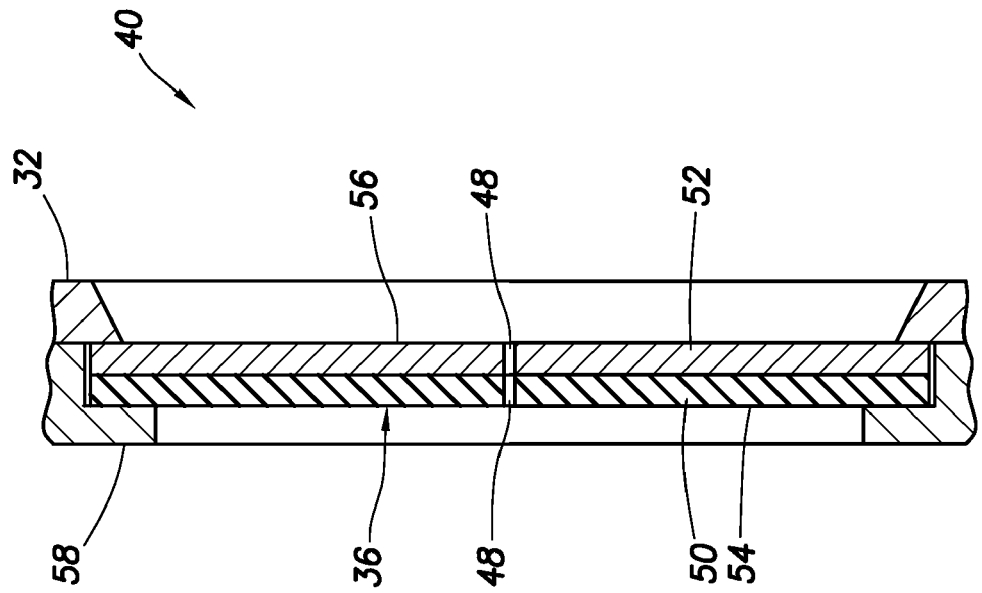
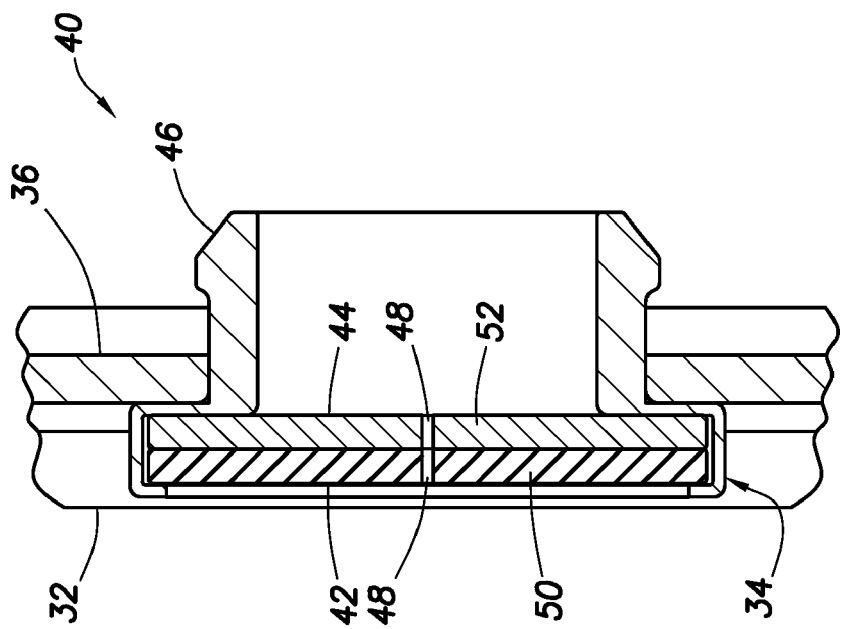
FIG.5
FIG.3

TRACTOR/TRAILER SUSPENSION WITH HUB TEMPERATURE INDICATING DEVICE

BACKGROUND

The present disclosure relates generally to vehicle suspensions and, in an embodiment described herein, more particularly provides a tractor/trailer suspension with a hub temperature indicating device.

It is known to equip a hub on a vehicle suspension with a temperature indicating mechanism. An example of such a mechanism is described in U.S. Pat. No. 6,546,892. This patent discloses an element which pops out of a hub cap plug when a fusible material melts. The element includes a colored spring-loaded stem.

Unfortunately, these prior temperature indicating mechanisms rely on moving mechanical components which are unreliable and relatively expensive to manufacture and assemble. It would be beneficial to be able to indicate clearly to a vehicle operator that an undesirable temperature change has occurred in a suspension hub, without this indication being provided by moving parts which are prone to failure and are uneconomical.

Therefore, it may be seen that improvements are needed in the art of indicating temperature changes in hubs of vehicle suspensions.

SUMMARY

In the present specification, a suspension and hub temperature indicating device are provided which solve at least one problem in the art. One example is described below in which the device is incorporated into a hub cap for the hub, with the device including a material which changes color when a temperature in the hub reaches an undesirable level. Further examples are described below in which the device comprises a plug or a window for the hub cap.

In one aspect, a vehicle suspension is provided which includes a hub which is configured to rotate about a spindle on bearings, the hub having an interior and an exterior. A hub temperature indicating device is visible from the exterior of the hub and is exposed to temperatures within the interior of the hub. The device includes a material which changes color in response to a predetermined change in the temperature within the interior of the hub.

In another aspect, a wheel hub temperature indicating device for use on a hub of a vehicle suspension is provided. The device includes a selected one of a hub cap plug and a hub cap window, including a material which changes color in response to a predetermined change in temperature within an interior of the hub.

In yet another aspect, a wheel hub temperature indicating device for use on a hub of a vehicle suspension is provided which includes a material which is operative to change color in response to a temperature change in an interior of the hub, the material comprising an irreversible temperature change indicating material; and another material adjacent the first material, the second material being operative to transfer heat between the interior of the hub and the first material; and the device being configured to attach to a hub cap for the hub.

These and other features, advantages and benefits will become apparent to one of ordinary skill in the art upon careful consideration of the detailed description of representative embodiments below and the accompanying drawings, in which similar elements are indicated in the various figures using the same reference numbers.

BRIEF DESCRIPTION OF THE DRAWINGS

FIG. 3 is an enlarged scale cross-sectional view of a hub temperature indicating device configured as a plug for a hub cap;

FIG. 5 is a cross-sectional view of a hub temperature indicating device configured as a window for a hub cap.

DETAILED DESCRIPTION

It is to be understood that the various embodiments described herein may be utilized in various orientations, such as inclined, inverted, horizontal, vertical, etc., and in various configurations, without departing from the principles of the present disclosure. The embodiments are described merely as examples of useful applications of the principles of the disclosure, which are not limited to any specific details of these embodiments.

Figure 1:
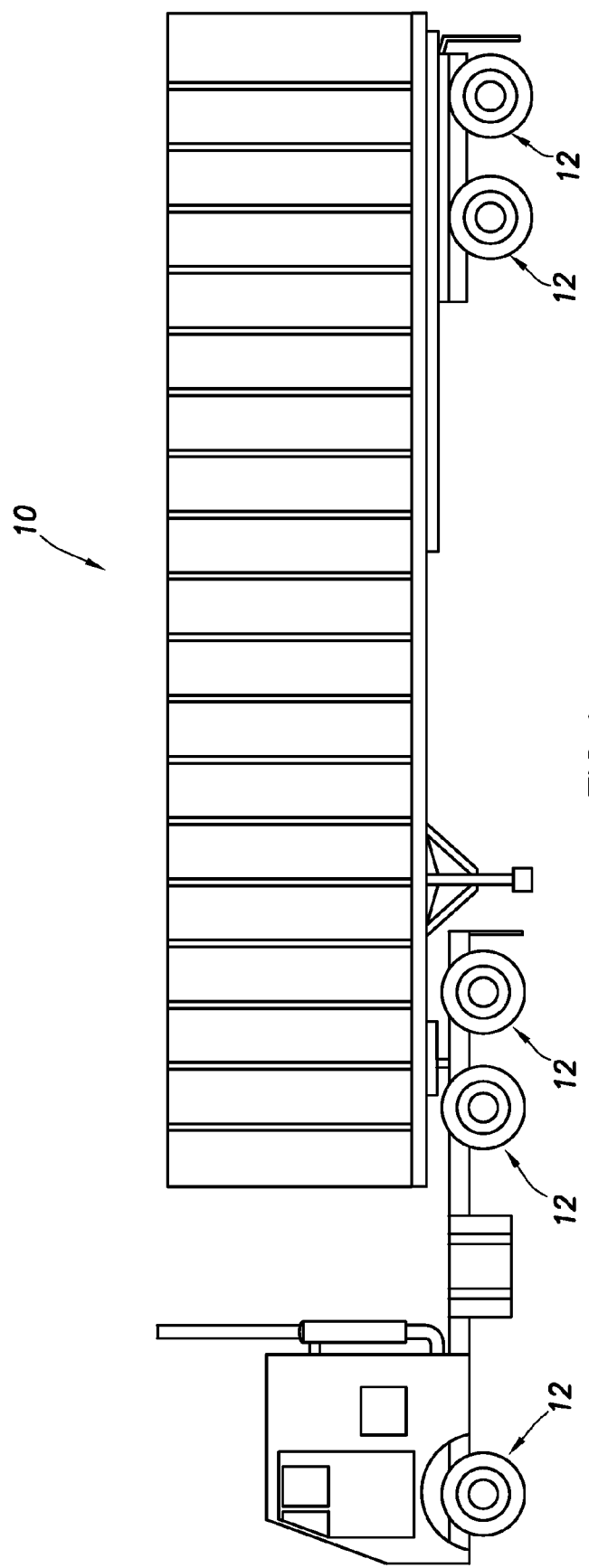
FIG. 1 is a side elevational view of a tractor/trailer rig which includes suspensions embodying principles of the present disclosure.

Representatively illustrated in FIG. 1 is a vehicle 10, in this case a tractor/trailer rig, which embodies principles of the present disclosure. The vehicle 10 includes several suspensions 12 which benefit from the features provided by this disclosure.

Figure 2:
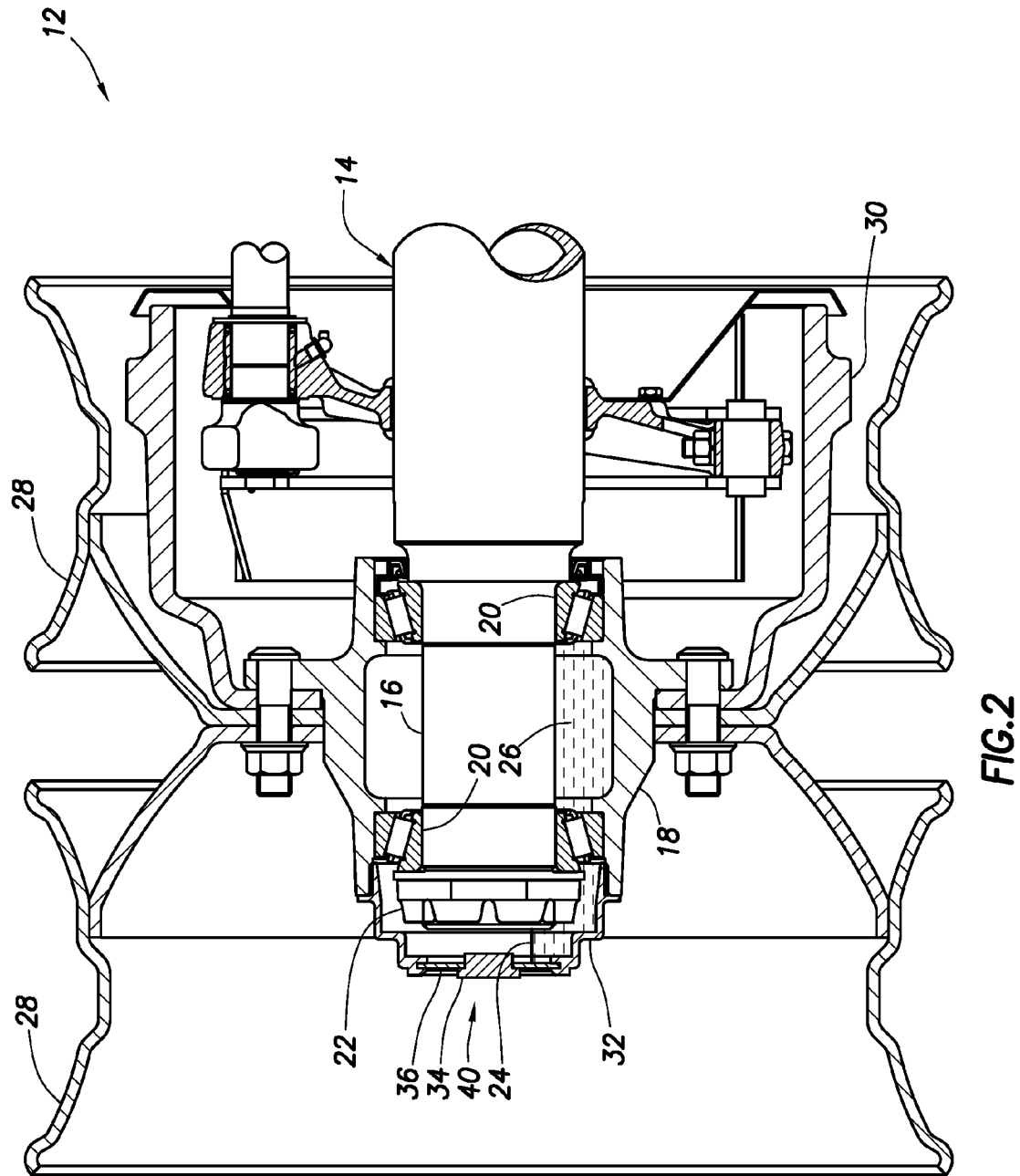
FIG. 2 is an enlarged scale partially cross-sectional view of a lateral end portion of a suspension which includes a hub temperature indicating device embodying principles of the present disclosure.

Referring additionally now to FIG. 2, an enlarged scale partially cross-sectional view of one lateral end of one of the suspensions 12 is representatively illustrated. In this view it may be seen that the suspension 12 includes an axle 14 having a spindle 16 formed at its outer end. As a matter of terminology, the axle 14 and its associated components are considered to be part of the suspension 12, since they assist in suspending the vehicle frame and body above a road surface.

A hub 18 is rotatable about the spindle 16 on bearings 20. A nut 22 is used to secure the hub 18 and bearings 20 to the spindle 16. A lubricant 24 (such as oil or grease) occupies a space 26 in an interior of the hub 18, in order to lubricate the bearings 20.

Wheels 28 and a brake drum 30 are secured to the hub 18 for rotation about the axle 14 on the spindle 16. If the suspension 12 is steerable, a steering knuckle (not shown) may be interposed between the axle 14 and the spindle 16.

Preferably, a predetermined torque and backing off procedure is applied to the nut 22 to apply a precise axial preload to the bearings 20, so that play in the assembly is held to a predetermined clearance, without undesirably stressing the bearings. Unfortunately, it is possible to overly stress the bearings 20, which can lead to their failure. In addition, the lubricant 24 can become contaminated (for example, with moisture or debris) and unsuitable for lubricating the bearings 20, which can also lead to their failure. Still further, the lubricant 24 can completely or partially escape from the interior of the hub 18, leaving the bearings 20 inadequately lubricated, which can also lead to their failure.

Thus, it will be appreciated that it is vitally important that the hub 18, bearings 20 and lubricant 24 (and seals to prevent the lubricant from escaping) be properly maintained to prevent the bearings and other components in the assembly from failing. Such a failure can in some circumstances result in the spindle 16 and/or bearings 20 failing, allowing the wheels 28, tires (not shown in FIG. 2, see FIG. 1) and other components to separate from the suspension 12, possibly causing extensive property damage and even casualties.

A hub cap 32 is provided to permit access to the interior of the hub 18, for example, to install, maintain or remove the nut 22, to seal off the outer end of the hub, and to fill or drain the lubricant 24. A plug 34 is provided for convenient filling of the lubricant 24 and, in some cases, to provide for venting the interior of the hub 18. A window 36 is provided so that the level of the lubricant 24 can be viewed from the exterior of the hub 18.

In a unique feature of the suspension 12, the plug 34 and/or window 36 comprise a device 40 which indicates a temperature change in the hub 18. As described more fully below, a color change in the device 40 indicates a corresponding temperature change in the hub 18. For example, the device 40 could change to a particular color when a certain elevated temperature has been reached in the hub 18. In this manner, an operator of the vehicle 10 could immediately see, merely by looking at the device 40, that the elevated temperature has occurred in the hub 18.

Such an elevated temperature could be an indication of impending failure of the bearings 20, since elevated temperatures can be caused by over-torquing the nut 22, loss of lubricant 24, contamination of the lubricant, etc. In any event, excessive temperature is generally undesirable in the hub 18, and the indication provided by the device 40 can prompt the operator to investigate the cause for the excessive temperature, and to take remedial action.

An example of the device 40 is representatively illustrated in FIG. 3. In this example, the device 40 comprises the plug 34. The plug 34 includes an outer disc 42 and an inner disc 44 retained in a recess formed in a body 46.

The body 46 is preferably made of a resilient material, such as an elastomer, for convenient installation in an opening in the window 36. Note that it is not necessary for the plug 34 to be installed in the window 36, since the plug could instead be installed in another portion of the hub 18 or hub cap 32.

The discs 42, 44 are provided with small holes 48 to vent the interior of the hub 18 and prevent condensation buildup in the hub. The holes 48 are not necessary in keeping with the principles of this disclosure, but if they are provided, they are preferably positioned where they will remain above the level of the lubricant 24 during operation of the suspension 12.

The outer disc 42 comprises a material 50 which changes color in response to a predetermined change in temperature within the hub 18. The color change may be from one color to another (e.g., green to red, etc.), or from clear or transparent to opaque (e.g., from no color to colored), or from opaque to clear or transparent. In the example of FIG. 3, it is preferred that the material 50 change from one color to another, but in other examples (such as, if the device 40 comprises the window 36, as described more fully below), it may be preferred that the material change between transparent and opaque.

The material 50 may be of the type known to those skilled in the art as an irreversible temperature indicator. The temperature indicating substance may be applied to a paper or other substrate, and then encased in a clear or transparent polymer, adhesive, etc., so that it is externally visible but is protected from the environment, lubricant 24, etc.

Alternatively, the color change in the material 50 could be temporary or reversible, if desired. However, it is preferred that the color change in the material 50 be permanent, so that the operator will know if the interior of the hub 18 has reached a certain level, even if the temperature has since decreased.

The inner disc 44 comprises a material 52 which readily transfers heat between the interior of the hub 18 and the outer disc 42. The material 52 could, for example, be a heat conducting alloy (such as an aluminum or copper alloy, etc.), polymer, or other type of material.

In this manner, the outer disc 42 is exposed to the heat within the hub 18, without being in direct contact. The inner disc 44 also provides structural support to the outer disc 42. If, however, the outer disc 42 is provided with sufficient structural support itself, and is sufficiently protected, the inner disc 44 may not be used.

Figure 4:
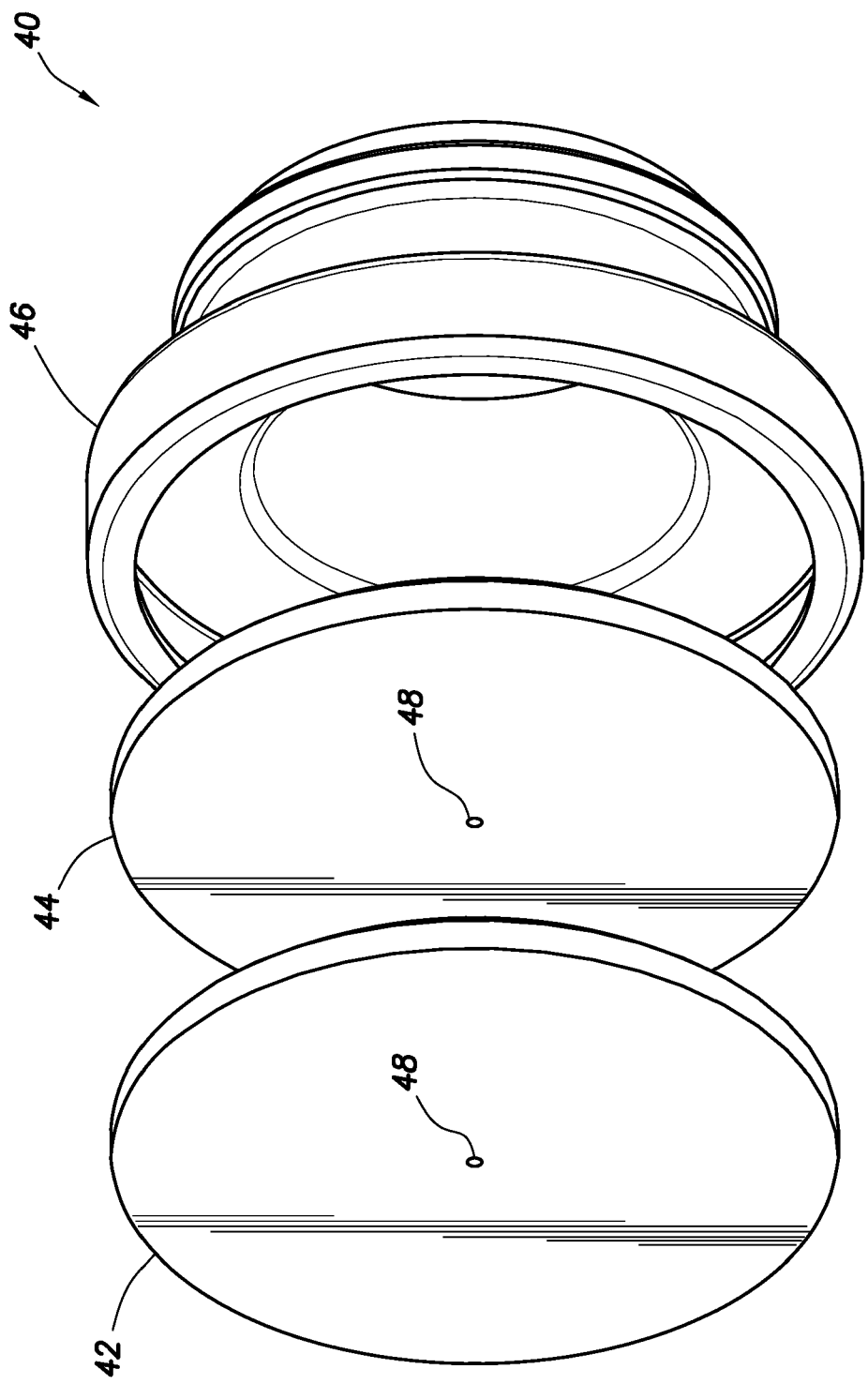
FIG. 4 is an isometric exploded view of the device of FIG. 3.

Referring additionally now to FIG. 4, an exploded view of the device 40 is representatively illustrated. In this view, the manner in which the device 40 is constructed can be clearly seen.

Although the two discs 42, 44 are depicted in FIG. 4 as being separately constructed, they could be constructed as a single element, they could be individual layers of a single element, other numbers or combinations of discs or layers could be used, etc. Therefore, it should be clearly understood that the principles of this disclosure are not limited only to the details of the devices 40 specifically described herein.

Referring additionally now to FIG. 5, another example is representatively illustrated in which the device 40 comprises the window 36. In addition, the plug 34 is not used.

Such a configuration may be appropriate where grease is used for the lubricant 24, instead of oil, in which case the plug 34 might be unsuitable for filling the hub 18 to an appropriate level with the grease. However, it should be understood that the device 40 could comprise both the window 36 and the plug 34, in keeping with the principles of this disclosure.

The materials 50, 52 as used in the device 40 and window 36 of FIG. 4 are preferably initially clear (or at least transparent), so that the level of the lubricant 24 in the hub 18 can be observed through the window 36. However, when the temperature in the hub 18 increases to a predetermined level, the color of the material 50 changes.

As discussed above, the color change could be from one color to another, from clear (or at least transparent) to opaque, or from opaque to clear (or at least transparent). If the material 50 is initially transparent, and then turns opaque when the predetermined temperature has been reached, then this could indicate to the operator that an excessive temperature has been reached.

Figure 6:
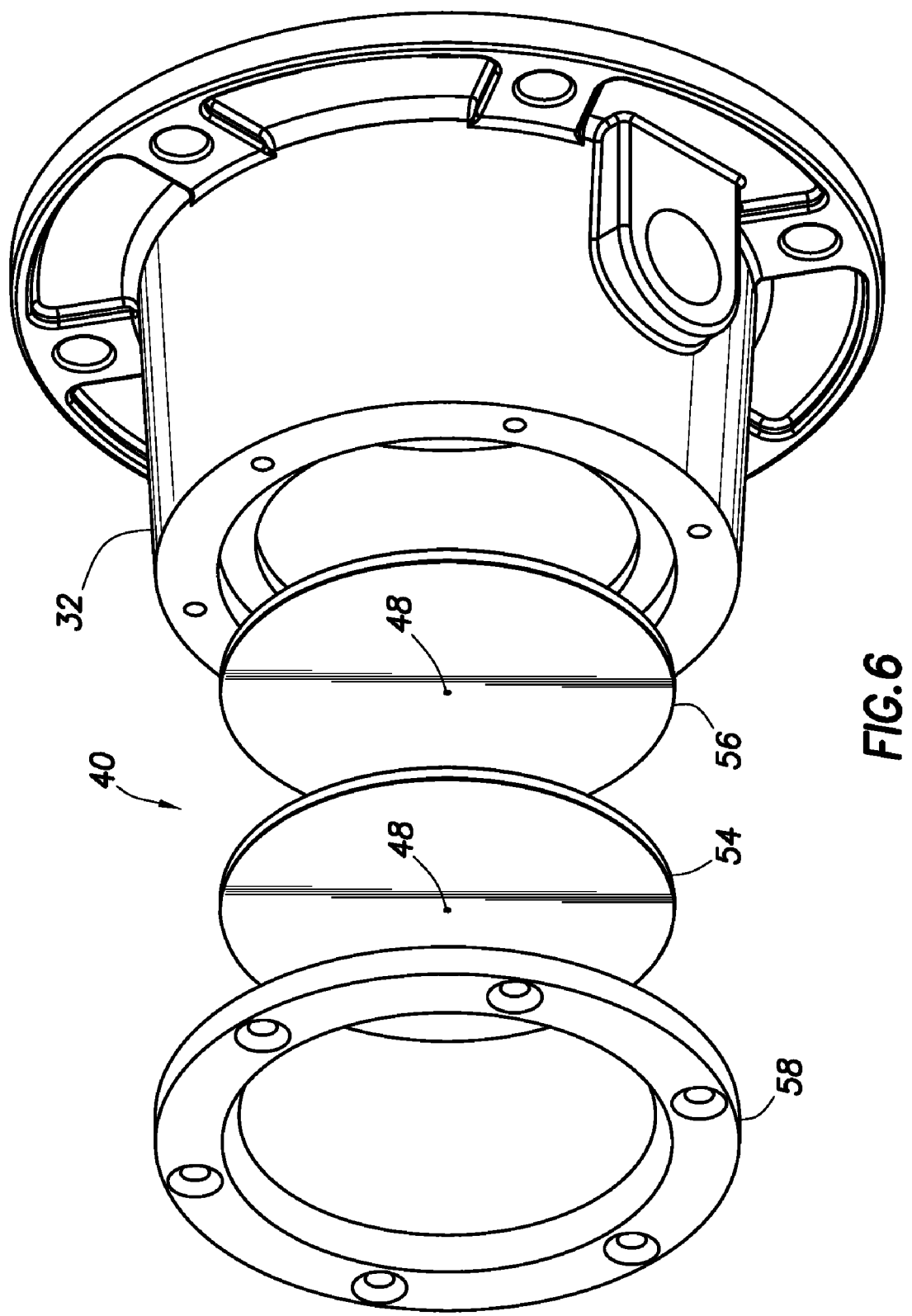
FIG. 6 is an exploded view of the hub cap and the device of FIG. 5.

Referring additionally now to FIG. 6, an exploded view of the device 40 is representatively illustrated. Construction details of the device 40 and hub cap 32 can be seen for this example.

Note that the device 40 is depicted in FIG. 6 as including two separate discs 54, 56 which are retained in the hub cap 32 by a retainer ring 58. However, as discussed above for the plug 34, the discs 54, 56 could be a single element, could be layers of a single element, or other numbers of discs or other elements could be provided in the device 40. The inner disc 56 may not be used if the outer disc 54 does not require additional structural support or isolation from the interior of the hub 18.

It may now be fully appreciated that important advancements are provided to the art of vehicle suspension hub temperature indicating by the above disclosure. These advancements include the elimination of moving parts or other failure-prone mechanisms in the temperature indicating device 40, an economical and straightforward construction of the device, and temperature change being readily indicated by a change in color of a material 50 of the device.

The above disclosure provides a vehicle suspension 12 which includes a hub 18 configured to rotate about a spindle 16 on bearings 20, with the hub 18 having an interior and an exterior. A hub temperature indicating device 40 is visible from the exterior of the hub 18 and is exposed to a temperature within the interior of the hub 18. The device 40 includes a material 50 which changes color in response to a predetermined change in the temperature within the interior of the hub 18.

The material 50 may change color in response to the temperature within the interior of the hub 18 reaching a predetermined level. The material 50 may change between transparent and opaque in response to the predetermined change in the temperature within the interior of the hub 18.

The material 50 may comprise a portion of a plug 34 for a hub cap 32 attached to the hub 18. The material 50 may comprise a portion of a window 36 for the hub cap 32.

A level of lubricant 24 in the interior of the hub 18 may be visible through the device 40.

The device 40 may also include another material 52 positioned between the first material 50 and the interior of the hub 18. The material 52 may transfer heat between the first material 50 and the interior of the hub 18.

The material 50 may comprise an irreversible temperature change indicating material.

Also described in the above disclosure is a wheel hub temperature indicating device 40 for use on a hub 18 of a vehicle suspension 12. The device 40 includes a selected one of a hub cap plug 34 and a hub cap window 36, including a material 50 which changes color in response to a predetermined change in temperature within an interior of the hub 18.

The above disclosure also provides a wheel hub temperature indicating device 40 for use on a hub 18 of a vehicle suspension 12, with the device 40 including a first material 50 which is operative to change color in response to a temperature change in an interior of the hub 18, the first material 50 comprising an irreversible temperature change indicating material; a second material 52 adjacent the first material 50, the second material 52 being operative to transfer heat between the interior of the hub 18 and the first material 50; and the device 40 being configured to attach to a hub cap 32 for the hub 18.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A vehicle suspension, comprising:
    a hub which rotates about a spindle on bearings, the hub having an interior and an exterior; and
    a hub temperature indicating device visible from the exterior of the hub and exposed to a temperature within the interior of the hub, the device including a first material which changes color in response to a predetermined change in the temperature within the interior of the hub, wherein the first material comprises a portion of a window for a hub cap attached to the hub.

2. The suspension of claim 1, wherein the first material changes color in response to the temperature within the interior of the hub reaching a predetermined level.

3. The suspension of claim 1, wherein the first material changes between transparent and opaque in response to the predetermined change in the temperature within the interior of the hub.

4. The suspension of claim 1, wherein the first material comprises a portion of a plug for a hub cap attached to the hub.

5. The suspension of claim 1, wherein a level of lubricant in the interior of the hub is visible through the device.

6. The suspension of claim 1, wherein the device further includes a second material positioned between the first material and the interior of the hub, and which transfers heat between the first material and the interior of the hub.

7. The suspension of claim 1, wherein the first material comprises an irreversible temperature change indicating material.

8. A wheel hub temperature indicating device for use on a hub of a vehicle suspension, the device comprising:
    a hub cap window, including a first material which changes color in response to a predetermined change in temperature within an interior of the hub, wherein the window is configured so that a level of lubricant in the interior of the hub is visible through the window.

9. The device of claim 8, wherein the first material changes color in response to the temperature within the interior of the hub reaching a predetermined level.

10. The device of claim 8, wherein the first material changes between transparent and opaque in response to the predetermined change in the temperature within the interior of the hub.

11. The device of claim 8, wherein the device further includes a second material adjacent the first material, and which transfers heat between the first material and the interior of the hub.

12. The device of claim 8, wherein the first material comprises an irreversible temperature change indicating material.

13. A wheel hub temperature indicating device for use on a hub of a vehicle suspension, the device comprising:
    a first material which changes color in response to a temperature change in an interior of the hub, the first material comprising an irreversible temperature change indicating material;
    a second material adjacent the first material, wherein the second material transfers heat between the interior of the hub and the first material; and
    the device being configured to attach to a hub cap for the hub, and wherein the first material comprises a portion of a window for the hub cap.

14. The device of claim 13, wherein the first material changes color in response to the temperature within the interior of the hub reaching a predetermined level.

15. The device of claim 13, wherein the first material changes between transparent and opaque in response to the predetermined change in the temperature within the interior of the hub.

* * * * *